E. J. VAUDREUIL.
APPARATUS FOR COOKING PULSE.
APPLICATION FILED APR. 4, 1914.
1,131,299.
Patented Mar. 9, 1915.
2 SHEETS—SHEET 2.
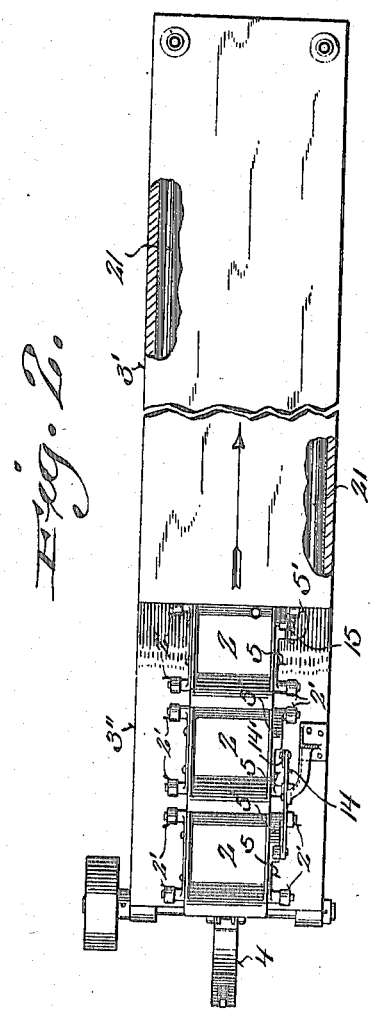
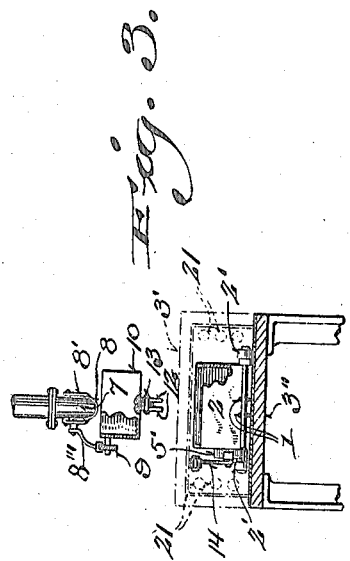

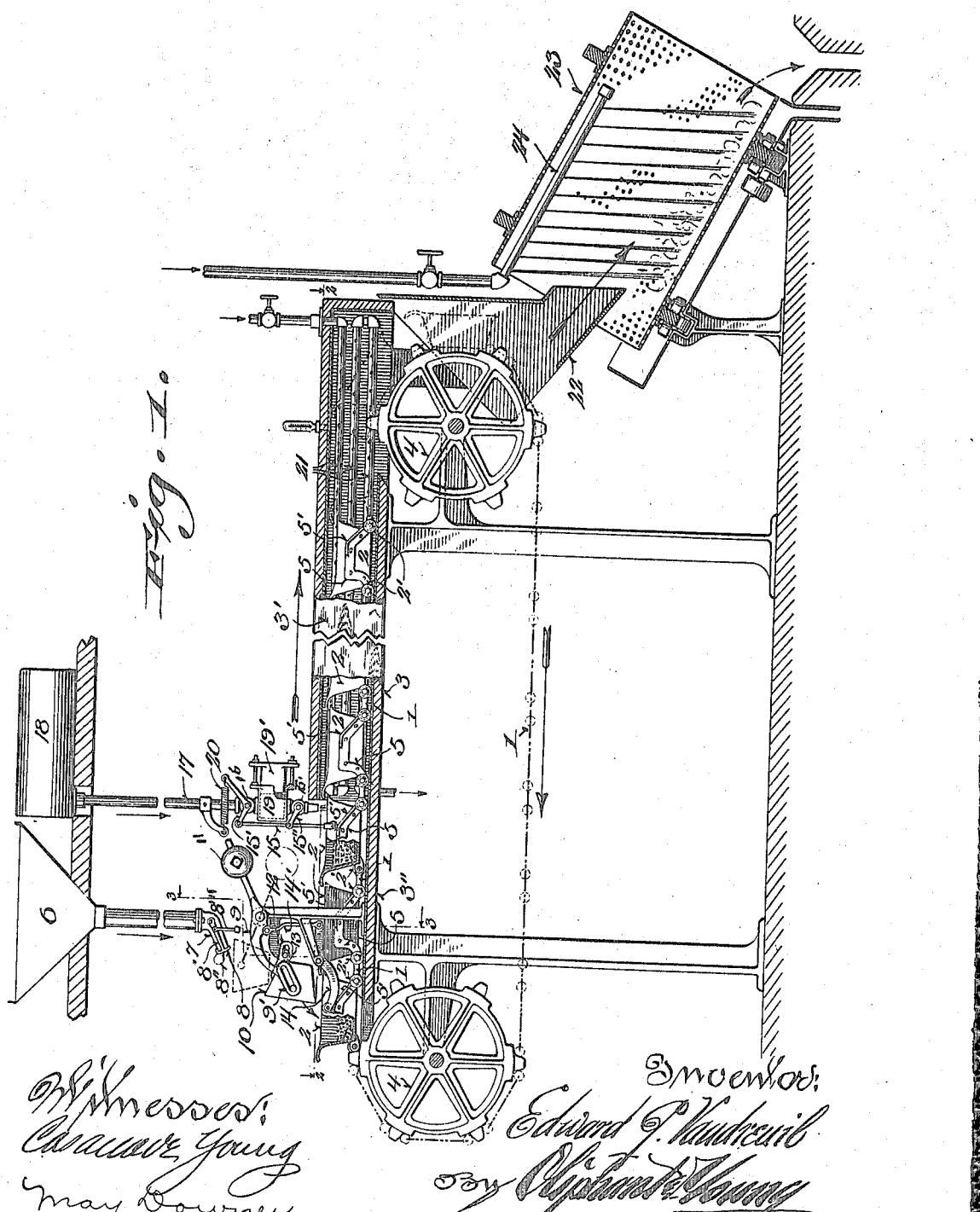

UNITED STATES PATENT OFFICE.

EDWARD J. VAUDREUIL, OF VAUDREUIL, WISCONSIN.

APPARATUS FOR COOKING PULSE.

1,131,299.  Specification of Letters Patent.  Patented Mar. 9, 1915.

Application filed April 4, 1914. Serial No. 829,560.

*To all whom it may concern:*

Be it known that I, EDWARD J. VAUDREUIL, a citizen of the United States, and resident of Vaudreuil, in the county of Jackson and State of Wisconsin, have invented certain new and useful Improvements in Apparatus for Cooking Pulse; and I do hereby declare that the following is a full, clear, and exact description thereof.

The object of my invention is to provide a simple, sanitary and effective apparatus for cooking and blanching peas, beans and other vegetables belonging to the pulse variety either in the green or dry state, the invention being such that the product is first confined in bulk and is thereafter separated into units or measured batches, to each of which batches is added a measured quantity of liquid, the hydrated batches are then successively moved through an oven whereby they are subjected to a uniform cooking temperature. The cooked batches of pulse are thereafter caused to commingle during their travel to a rinsing and scouring apparatus, where the method is completed, it being understood that, under ordinary conditions after such completion the articles are canned.

By the above method of treatment the product as a whole is cooked uniformly and speedily and the entire run of the bulk, due to the fact that clean water is added in correct proportions to each batch, is uniform. The mixing in batches as stated thus overcomes the objectionable method now in general use, which method embodies an arrangement whereby the bulk of the product is divided into portions, which portions are subjected to hot water contained in a tank, whereby the product is cooked and, although in some instances this tank of hot water is arranged to have a feed and overflow, it will quickly become contaminated by the secretions from the pulse. The water, as a consequence of the foreign deposits, will therefore at the last of the run be in such foul condition that that portion of the product in the final run will be much lower in grade than that portion of the product which was first subjected to the cooking operation. This variation in the grade has been a great source of annoyance to canners and thus frequently causes two grades of products. Hence it is apparent that by my method the objectionable features mentioned are entirely overcome as the cooking of a large batch of material can be as accurately and uniformly effected as in the case where a housewife prepares a small quantity of similar product.

With the above objects in view the invention consists in certain peculiarities of construction whereby the method is carried out, which apparatus and method is fully set forth hereinafter with reference to the accompanying drawings and subsequently claimed.

It should also be understood that, while I have shown in the accompanying drawings one exemplification of my invention, I may, without departing from the spirit of the same, vary the mechanical construction indefinitely within the knowledge of skilled mechanics, the only essential elements being some means for carrying out the method herein mentioned.

In the drawings Figure 1 represents a side elevation of an apparatus embodying the features of my invention with parts broken away and parts in section to more clearly illustrate certain structural features; Fig. 2, a plan view of the same with parts broken away and parts in section to illustrate structural features, and Fig. 3, a detailed cross-section of the machine, the section being indicated by line 3—3 of Fig. 1.

Referring by characters to the drawings, 1 represents an endless belt conveyer of the chain type provided with buckets 2, each of which buckets, upon the working stretch of the conveyer, is supported by rollers 2', that are adapted to ride on the floor 3 of an oven or cooker in the form of an open-ended trough 3', the trough being provided with a forwardly disposed receiving table 3'' constituting an extension of the floor. The conveyer is supported by front and rear sheaves 4, one of which constitutes a driving sheave, whereby said conveyer is caused to travel slowly through the trough or oven. Each bucket is provided with link straps 5 forming units of the conveyer chain and one of the straps of each pair are bowed upwardly to form tappet cams 5'. The rear wall of each bucket is provided with a lip 2'' that overlaps the front wall of the preceding bucket to form a deflecting apron, whereby scattered material delivered to the traveling buckets from a fixed point thereover is trapped.

The peas or other product to be cooked and blanched is stored in an overhead hopper 6, which hopper has a delivery chute provided with a discharge boot 7, the same being controlled by a shutter valve 8 that is suspended from a bail 8'. The bail is pivoted to the walls of the boot and the valve carries a weight 8'', whereby movement of the valve is controlled in one direction to close the mouth of the boot. A scale beam 9 is fulcrumed under the boot mouth having one arm provided with a slot 9', into which slot is pivotally supported a measuring vessel 10 and the opposite arm of the scale-beam carries an adjustable weight 11, whereby the bulk of the product deposited in the vessel is measured. It is understood by this arrangement that the weight would be set to perdeterminedly regulate the quantity of the product that may be discharged into the vessel and that these measured quantities are, in turn, deposited successively into the conveyer buckets. The vessel 10 is also provided with a finger 12, which finger forms a vertically disposed slot constituting a guide for an anchor-pin 13. The weight 8'' of the valve-bail carries a thrust-rod 8''', the free end of which rod is arranged to be engaged by the vessel-carrying end of the scale-beam. When the measuring vessel is held in its elevated position for receiving a load, it is obvious that the thrust-rod will, through its bail connection, hold the shuttle valve open, whereby the contents of the hopper 6 is caused to flow into said measuring vessel. A tappet-lever 14 is fulcrumed to a bracket carried by the table 3', one arm of which is connected by a link 14' to the scale-beam, the opposite arm of the lever being arranged in the path of travel of the series of tappet cams 5', which constitute the tappet-cams previously described. As shown in Fig. 1, it is apparent by this arrangement that when the flow of peas into the measuring vessel overbalances the scale-beam, the said vessel will drop slightly and thus permit the valve to cut off the supply from the hopper. In this slightly dropped position the anchor-pin 13 will be resting in the upper end of the slot formed by the guide-finger 12. The bucket of the conveyer now traveling under the measuring vessel will trip the same by engagement of its tappet-cam 5' with the lever 14, whereby said lever will lift the vessel-carrying end of the scale-beam and thus, through its trunnion connection with said vessel, cause the latter to rock upon the anchor-pin 13, whereby the mouth of the vessel will assume the dumping position shown in Fig. 1 of the drawings and thus the measured quantity of pulse will be deposited within the bucket aligned under the now inverted vessel. This measured batch of pulse will travel slowly toward the cooker or oven and, in the meantime, the tappet lever 14 having passed the high face of the tappet-cam 5', the scale-beam weight 11 will cause the empty bucket to be returned to its normal receiving position by a reverse movement from that just described and in the final lift of the measuring vessel, when its mouth is alined with the discharge boot, the scale-beam will thus automatically open the valve, whereby the pulse will again be caused to flow into said vessel.

The batch of pulse just measured and deposited within the conveyer bucket will now be subjected to a measured quantity of water. The hydration of the batch of pulse is effected by engagement of the tappet-cam 5' with a thrust-rod 15, which thrust-rod is linked to arms 15', 15'', of inlet and discharge valves 16, 16', respectively. The inlet valve controls a supply pipe 17, which pipe communicates with a hot water tank 18 and a drum 19. The discharge valve 16 controls the flow of water from the drum and is fitted into a nozzle that extends therefrom, which nozzle is adapted to deliver the contents of the drum to the conveyer bucket alined thereunder containing the dry measured batch of pulse. Hence it will be seen that a measured quantity of hot water is delivered to each batch of the pulse prior to its entrance into the cooking oven.

In order to regulate the amount of water to be delivered to each batch, I have shown a means for varying the capacity of the measuring drum 19, which means comprises a shell-like head 19' that is in telescopic union with one end of the drum and this head is arranged to be moved in or out, being held in its adjusted position by suitable bolts and set-screws, as shown. It is manifest that, owing to the connections between the inlet and discharge valves, the said inlet valve is closed coincident to or slightly in advance of opening the discharge valve. Thus the source of water supply is cut off after a measured quantity of water has been deposited in the drum and this water is permitted to flow from the drum when the discharge valve is opened. After the batch of pulse has been hydrated, the tappet-cam 5' will pass the thrust-rod and thus permit the valves to assume their normal position by the pull of a spring 20, in which position the discharge valve is closed and the inlet valve is opened. By this automatic arrangement it is apparent that, as the conveyer buckets upon the working stretch travel slowly into the cooker, they are supplied with measured quantities of pulse and water and, in traveling through the cooker or oven they are subjected to the desired cooking temperature. The oven may be, as shown, heated by coils of pipe 21 arranged upon either side of the buckets, to which coils is supplied steam, hot air or other heating medium.

It is also obvious that I may, without departing from the spirit of my invention, utilize a double-walled oven, whereby the same may be heated by gas or other fuel indirectly, or I may use live steam, which steam may be injected into the oven in any suitable manner. This heating apparatus, however, forms no part of my invention except so far as that it embodies some means of cooking the pulse in its travel.

The oven is of sufficient length with respect to the slow movement of the conveyer to thoroughly cook the various batches as they travel therethrough and, by this arrangement the material is kept continually moving when being operated upon to thus save time in the operation, but it is understood that, if desired, the conveyer may be moved intermittently under some conditions.

It is also apparent that, while I have shown a weight-controlled measuring apparatus for regulating the size of the batches of pulse and an expansible and contractable drum for measuring the quantities of water delivered to said pulse, I may, without departing from the spirit of my invention, utilize the weighing means for both the water and pulse or vice versa.

After a series of the batches have been cooked, they are successively dumped into an inclined chute 22 as the buckets travel over the rear sheave 4. The various batches are thereby mixed and from the chute they are delivered into an inclined open ended drum screen 23, where they are drained and scoured by being subjected to a shower of water which is delivered from a spray-pipe 24, a perforated head of the same being extended into the screen. The screen may be stationary or revolved as the case may require and, after passing through said screen, the cooked product is discharged through its delivery mouth into a suitable container, it being understood that the rinsing water is trapped by a trough 24 that is arranged under the screen as shown.

I claim:

1. A cooking apparatus comprising an oven, a bucket-carrying conveyer arranged to travel therethrough, a product supply pipe and a liquid supply pipe, and valve-controlled means in communication with each pipe for delivering measured quantities of the product and liquid to the buckets.

2. A cooking apparatus comprising an oven, a bucket-carrying conveyer arranged to travel therethrough, a product supply pipe and a liquid supply pipe, valve-controlled means in communication with each pipe for delivering measured quantities of the product and liquid to the buckets, and a screening mechanism arranged to receive the bucket contents.

In testimony that I claim the foregoing I have hereunto set my hand at Milwaukee in the county of Milwaukee and State of Wisconsin in the presence of two witnesses.

EDWARD J. VAUDREUIL.

Witnesses:
 Geo. W. Young,
 M F. Downey.